US010257260B2

(12) United States Patent
Bellizia et al.

(10) Patent No.: US 10,257,260 B2
(45) Date of Patent: Apr. 9, 2019

(54) MANAGEMENT OF A COMPUTING SYSTEM WITH DYNAMIC CHANGE OF ROLES

(71) Applicant: International Business Machines Corporation, Armonk, NY (US)

(72) Inventors: Valerio Bellizia, Carpineto Romano (IT); Nicola Milanese, Rome (IT); Luigi Pichetti, Rome (IT); Marco Secchi, Rome (IT)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 14/931,433

(22) Filed: Nov. 3, 2015

(65) Prior Publication Data
US 2016/0134463 A1 May 12, 2016

(30) Foreign Application Priority Data

Nov. 12, 2014 (GB) .................................. 1420104.0

(51) Int. Cl.
*H04L 29/08* (2006.01)
*H04L 12/24* (2006.01)
(52) U.S. Cl.
CPC .......... *H04L 67/10* (2013.01); *H04L 41/0816* (2013.01); *H04L 41/0893* (2013.01)
(58) Field of Classification Search
CPC .. H04L 67/10; H04L 41/0816; H04L 41/0893
(Continued)

(56) References Cited

U.S. PATENT DOCUMENTS 8,099,494 B2 1/2012 Sedukhin et al.
8,271,949 B2 9/2012 Bernardini et al.
(Continued)

FOREIGN PATENT DOCUMENTS

WO WO2007017296 A1 2/2007
WO WO2013072232 A1 5/2013

OTHER PUBLICATIONS

Hewlett, Thin Client vs Thick Client Architecture, Dec. 2, 2008, richhewlett.com (6 pages).*
(Continued)

*Primary Examiner* — Wing F Chan
*Assistant Examiner* — Leon Y Tseng
(74) *Attorney, Agent, or Firm* — Yee & Associates, P.C.; Jeffrey S. LaBaw

(57) ABSTRACT

A solution for managing a computing system comprising a plurality of client computing machines to be managed and at least one server computing machine for controlling the managing of the client computing machines, wherein each client computing machine has at least one of a plurality of roles in a deployment infrastructure for deploying management data from said at least one server computing machine to the client computing machines. A corresponding method comprises monitoring one or more operative parameters of each client computing machine against one or more reference policies, detecting a non-compliance of the operative parameters to the reference policies, and changing the role of at least one of the client computing machines in response to the non-compliance of the operative parameters to the reference policies for restoring a compliance thereto.

21 Claims, 6 Drawing Sheets

(58) Field of Classification Search
USPC .......................................................... 709/223
See application file for complete search history.

(56) References Cited

U.S. PATENT DOCUMENTS

| | | | |
|---|---|---|---|
| 8,572,439 B2 | 10/2013 | Stanko et al. | |
| 2007/0061125 A1* | 3/2007 | Bhatt | G06F 21/577 |
| | | | 703/20 |
| 2011/0066841 A1* | 3/2011 | Goodrow | H04L 43/0894 |
| | | | 713/150 |
| 2012/0311011 A1 | 12/2012 | Appleby et al. | |
| 2012/0311111 A1 | 12/2012 | Frew et al. | |
| 2014/0047084 A1 | 2/2014 | Breternitz et al. | |
| 2017/0206351 A1* | 7/2017 | Jay | G06F 21/552 |

OTHER PUBLICATIONS

MySQL, wikipedia.org (16 pages).*
MySQL 5.5 Reference Manual, Section B.5.2.7, dev.mysql.com (1 page).*

* cited by examiner

MANAGEMENT OF A COMPUTING SYSTEM WITH DYNAMIC CHANGE OF ROLES

CROSS-REFERENCE TO RELATED APPLICATION(S)

This application claims the benefit of priority to United Kingdom Patent Application No. GB 1420104.0, filed Nov. 12, 2014, the entire contents of which are incorporated herein by reference.

TECHNICAL FIELD

The present disclosure relates to the Information Technology (IT) field. More specifically, this disclosure relates to the management of a computing system.

BACKGROUND

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The management of computing systems plays a key role in several contexts, and especially in large organizations having a high number of client computing machines (or simply clients) to be managed (for example, up to some hundreds or thousands). For this purpose, various resource management applications are available for facilitating the management of the clients from a server computing machine (or simply server) of the computing system; a commercial example of these management applications is IBM Endpoint Manager (IEM) by IBM Corporation (trademarks).

The resource management applications are generally based on an ad-hoc deployment infrastructure that facilitates a deployment of management data from the server on the clients (such as new versions of software products to be installed thereon). For example, some of the clients may operate as relays for other (child) clients depending thereon; this hierarchical organization of the clients may be multitier, with the child clients that in turn operate as relays for further child clients depending thereon. Each relay caches the management data downloaded from the server temporarily for its supply to the respective child clients directly (without the need of downloading it again from the server). The relays allow reducing traffic on a corresponding communication network, and they may provide back-up communication paths among the clients and the server (in case of either malfunctioning or overload of their normal communication paths).

The definition of the deployment infrastructure for managing the computing system may be quite complex. Moreover, the computing system may change dynamically over time; therefore, a deployment infrastructure that is adequate at an initial set-up of the computing system may become inadequate later on. For example, a relay dimensioned to serve a predetermined number of child clients may not work properly if the number of child clients increases excessively. This is exacerbated when the clients are mobile devices (for example, smart-phones), since they may change the corresponding relays continuously according to their position.

Elastic scaling techniques are known in the field of cloud computing environments to improve their effectiveness. For example, US-A-20120311011 (the entire disclosure of which is herein incorporated by reference) describes a cloud configuration system that provides the ability to dynamically reconfigure a set of computing resources to define a cloud into multiple separate logical cloud instances (based on a new configuration for datacenter resources comprising different roles for various servers, different network configuration, different relationships with other datacenters and/or cloud instances).

In the context of the management of computing systems, WO-A-2007017296 (the entire disclosure of which is herein incorporated by reference) describes a management system which defines and applies a federated set of actions, resulting from the combination of input data gathered from the different components; the data gathered results into a self-optimized application system, through actions taken at different levels (comprising a first level concerning application such as job priorities and job reorganization, a second level concerning system within a predefined and assigned set of resource and a third level concerning the global architecture by extending the resource allocated to the applications from a shared pool and adding resource dynamically to the application system infrastructure according to needs).

Therefore, the inadequacy of the deployment infrastructure might be restored by increasing the computing resources of the clients accordingly. For example, when too many child clients depend on a relay that may not serve them efficiently any longer, additional computing resources (for example, processing power, working memory) might be provided to the relay.

However, this involves a human intervention for providing the additional computing resources to the clients; at the same time, the operation of the involved clients has to be stopped during the provision of their additional computing resources. All of the above adversely affects the performance of the computing system. Moreover, these additional computing resources increase the costs of the computing system.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of changing a role of the computing machines dynamically.

Particularly, an aspect provides a method for managing a computing system, wherein one or more operative parameters of each client computing machine to be managed are monitored against one or more reference policies, and the role of at least one of the client computing machines is changed in response to a non-compliance of the operative parameters to the reference policies for restoring a compliance thereto.

A further aspect provides a computer program for implementing the method (and a corresponding computer program product).

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

The solution of the present disclosure, as well as further features and the advantages thereof, will be best understood with reference to the following detailed description thereof, given purely by way of a non-restrictive indication, to be read in conjunction with the accompanying drawings (wherein, for the sake of simplicity, corresponding elements are denoted with equal or similar references and their explanation is not repeated, and the name of each entity is generally used to denote both its type and its attributes—such as value, content and representation). Particularly.

DETAILED DESCRIPTION

Figure 1:
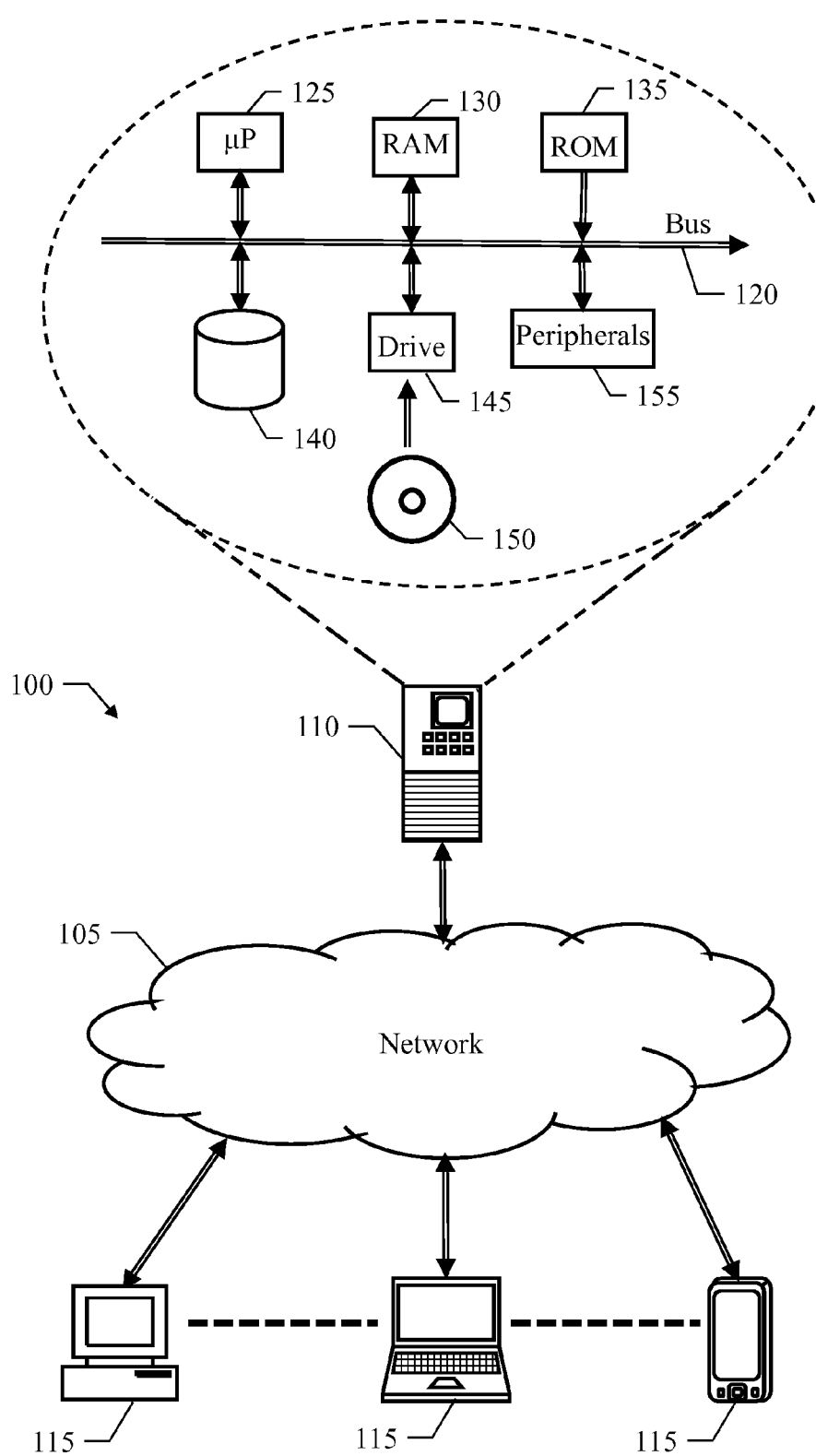
FIG. 1 shows a schematic block-diagram of a computing system wherein the solution according to an embodiment of the present disclosure may be applied.

With reference in particular to FIG. 1, a schematic block-diagram is shown of a computing system 100 wherein the solution according to an embodiment of the present disclosure may be applied.

Particularly, the computing system 100 has a distributed architecture, wherein multiple computing machines are connected among them through a communication network 105 (for example, in the Internet). One of the computing machines of the computing system 100 (or more) has a role of server (simply denoted as server 110). The server 110 controls the management of the other computing machines of the computing system 100 that have a role of client (simply denoted as clients 115), for example, for maintaining any software product running thereon up-to-date.

The server 110 comprises several units that are connected in parallel to a bus structure 120. In detail, one or more microprocessors (μP) 125 control operation of the server 110; a RAM 130 is used as a working memory by the microprocessors 125, and a ROM 135 stores basic code for a bootstrap of the server 110. The server 110 is also provided with a mass-memory comprising one or more hard disks 140 and drives 145 for reading/writing removable storage units 150 (for example, optical disks). Moreover, the server 110 has several peripherals 155 (for example, a keyboard, a mouse, a monitor and a network adapter for connecting to the communication network 105). Each client 115 (for example, a desktop, a laptop or a smart-phone) has a similar architecture suitably scaled (not shown in the figure).

Figure 2:
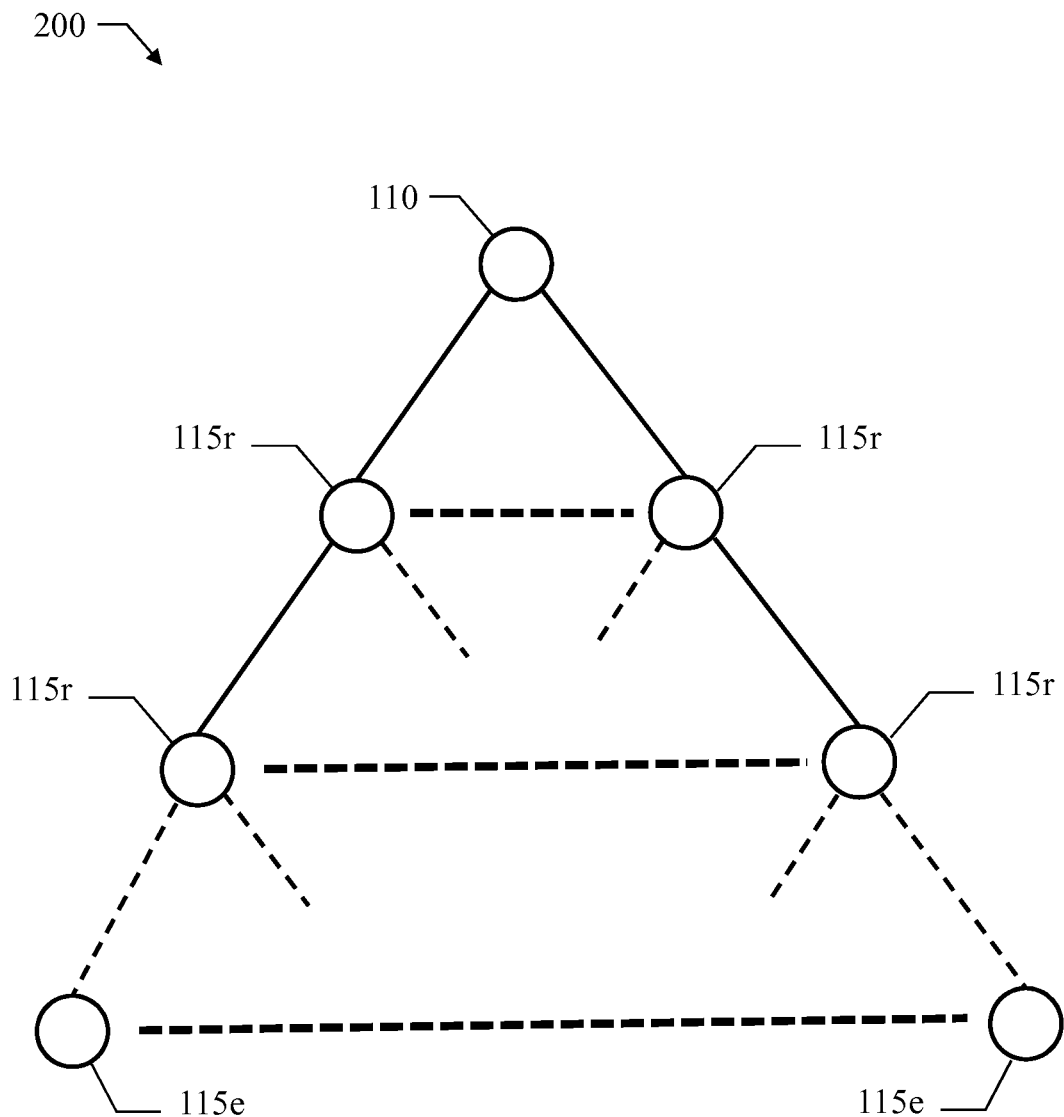
FIG. 2 shows an exemplary deployment infrastructure of this computing system.

With reference now to FIG. 2, an exemplary deployment infrastructure 200 of this computing system is shown.

The deployment infrastructure 200 facilitates the deployment of management data from the server 110 onto the clients 115 (for example, software packages of new software products, new versions, service packs or patches thereof).

For this purpose, the server 110 and the clients 115 are organized hierarchically in a tree (denoted with the same reference 200). The server 110 and each client 115 define corresponding nodes of the tree 200. Particularly, the server 110 defines a root node of the tree 200. The server 110 communicates with each client 115 through a corresponding communication path of the tree 200. For this purpose, the server 110 may communicate with some clients 115 directly; in this case, each client 115 is a child node of the server 110 in the tree 200. Moreover, the server 110 may communicate with the clients 115 indirectly through one or more other clients 115 that have a further role of relay, each one for serving one or more (child) clients 115 depending thereon (with the clients 115 having the role of relay that are referred to as relays and differentiated with the reference 115r, and with the pure clients, defining leaf nodes of the tree 200 without any child node dependent thereon, that are referred to as endpoints and differentiated with the reference 115e). Generally, for performance reasons (especially when the number of clients 115 is very high), the tree 200 has a multi-tier structure, wherein a plurality of relays 115r are provided in the communication paths among the server 110 and the endpoints 115e.

Figure 3A:
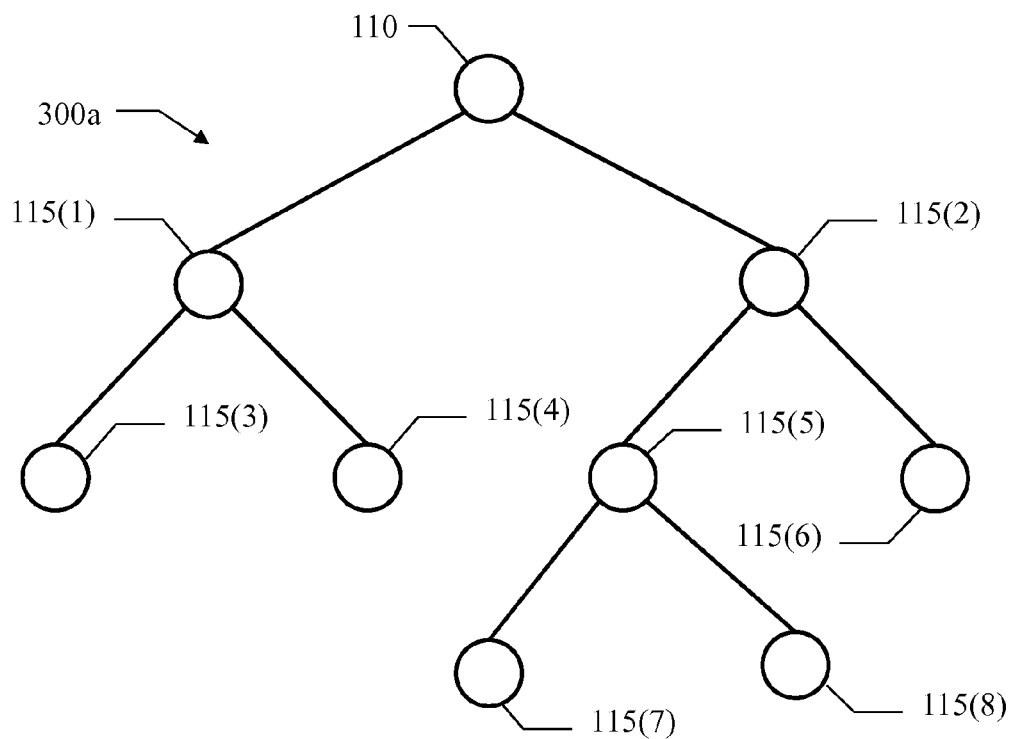
FIG. 3A-FIG. 3B show an exemplary application of the solution according to an embodiment of the present disclosure.
Figure 3B:
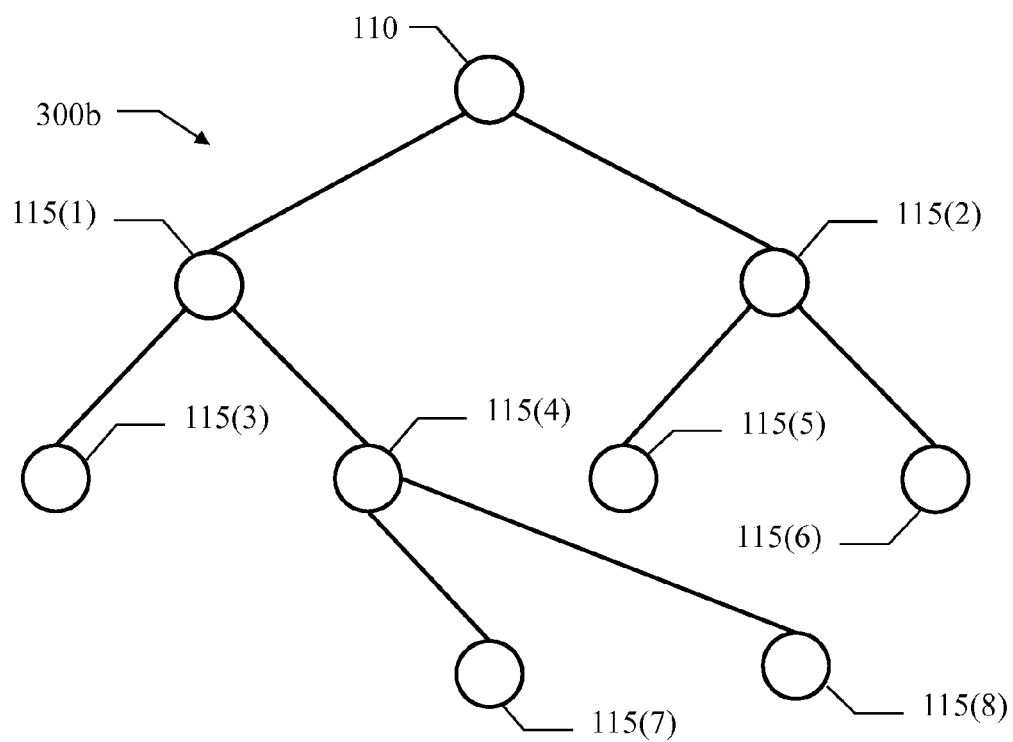

With reference now to FIG. 3A-FIG. 3B, an exemplary application is shown of the solution according to an embodiment of the present disclosure.

Starting from FIG. 3A, a very simple computing system is considered, wherein the corresponding deployment structure (denoted with the reference 300a) comprises the server 110 and eight clients, differentiated with the references 115(1)-115(8). Particularly, the clients 115(3), 115(4), 115(6), 115(7) and 115(8) are endpoints, whereas the client 115(1) is a relay for the clients 115(3),115(4), the client 115(2) is a relay for the clients 115(5),115(6) and the client 115(5) is a relay for the clients 115(7),115(8).

In the solution according to an embodiment of the present disclosure, one or more operative parameters of the clients 115(1)-115(8) are monitored (for example, the size of the working memory of each client 115(1)-115(8) and the number of child clients depending on each relay 115(1),115(2), 115(5)). These operative parameters are monitored against one or more reference policies (for example, defining the maximum number of child clients that may depend on each relay according to the size of its working memory). When (some of) the operative parameters are not compliant to the reference policies, the role of one or more clients 115(1)-115(8) is changed for restoring the compliance of the operative parameters to the reference policies.

For example, the number of child clients depending on the relay 115(5) may become too high for the size of its working memory; at the same time, the size of the working memory of the endpoint 115(4) may be large enough for allowing it to serve the child clients of the relay 115(5).

In this case, as shown in FIG. 3B, the relay 115(5) is demoted to endpoint (with the clients 115(7),115(8) that are not dependent thereon any longer); the endpoint 115(4) is instead promoted to relay for the same (child) clients 115(7),115(8). In this way, a new deployment structure of the computing system (differentiated with the reference 300b) is obtained, wherein the (new) relays 115(1), 115(2) and 115(4) may now serve their child clients 115(3),115(4), 115(5),115(6) and 115(7),115(8), respectively, efficiently.

In this way, the deployment infrastructure of the computing system self-adapts to the reference policies; therefore, its definition is significantly simplified.

Moreover, the deployment infrastructure of the computing system self-heals dynamically. Therefore, the deployment infrastructure remains adequate even when the computing system changes over time; this is particularly evident when the clients are mobile devices (for example, smartphones) that may change the corresponding relays continuously according to their position.

The above-described solution reduces (down to completely remove) any human intervention (since the change of the roles of the clients may be performed automatically, at least in part). The required change of the roles of the clients is quite fast (down to a few minutes); moreover, this operation may also be performed without stopping the clients. All of the above has a beneficial effect on the performance of the computing system.

Moreover, the compliance of the operative parameters to the reference policies is restored by exploiting resources of the computing system that are already available, and then without increasing the cost thereof.

Figure 4:
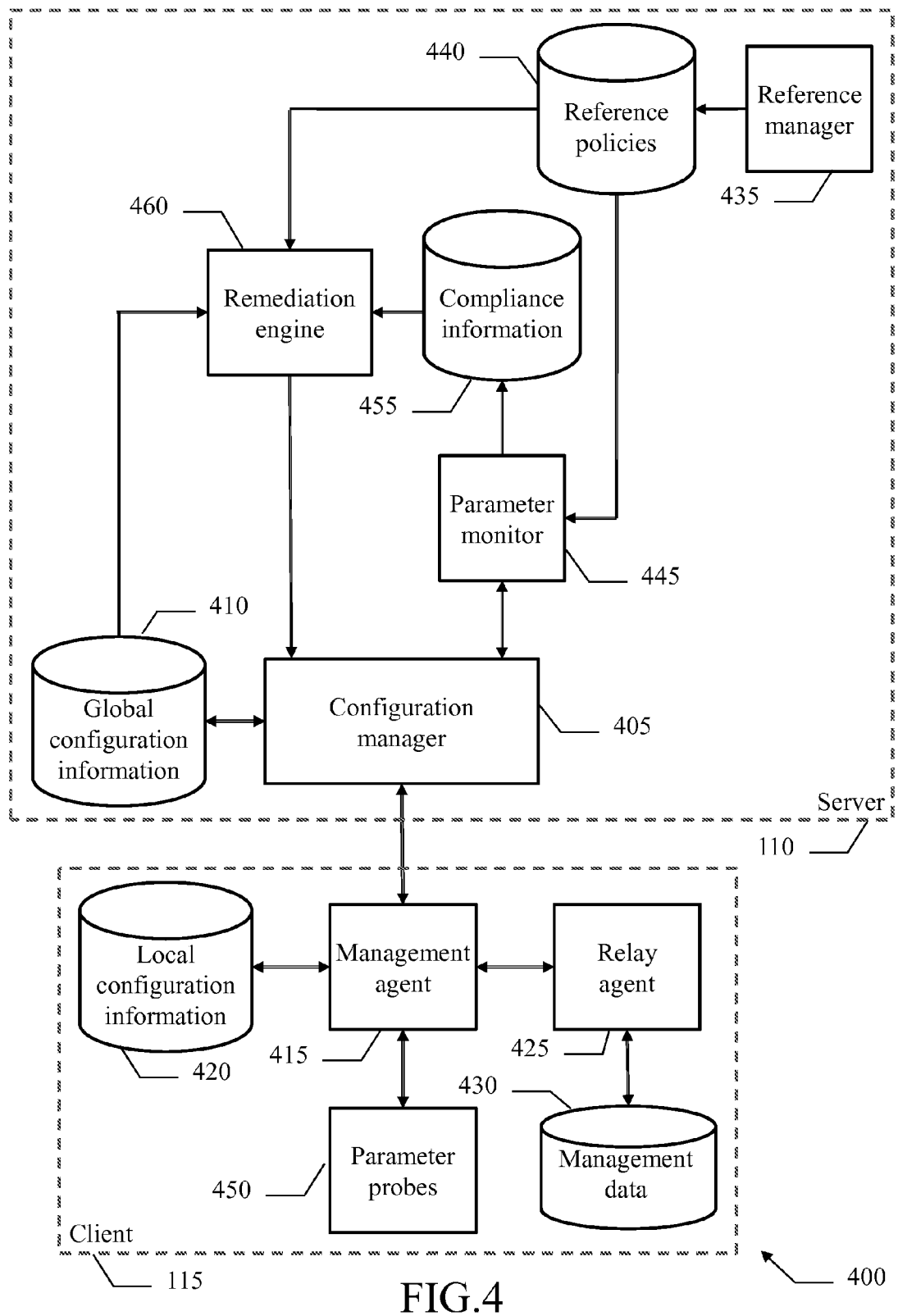
FIG. 4 shows the main software components that may be used to implement the solution according to an embodiment of the present disclosure.

With reference now to FIG. 4, the main software components are shown that may be used to implement the solution according to an embodiment of the present disclosure.

All the software components (programs and data) are denoted as a whole with the reference 400. The software components 400 are typically stored in the mass memory and loaded (at least partially) into the working memory of the corresponding computing machines when the programs are running. The programs are initially installed into the mass memory, for example, from removable storage units or from the communication network. In this respect, each software component may represent a module, segment or portion of code, which comprises one or more executable instructions for implementing the specified logical function.

The computing system runs a resource management application (for example, the above-mentioned IEM). The resource management application may be based on management rules (or policies) that define conditions to be fulfilled by the clients 115 (only one shown in the figure) to be compliant thereto and actions to be executed on the clients 115 to make them compliant to the management rules; for example, the management rules may indicate the migration to a different operating system, the installation of a new software application, the upgrade of a software product (operating system/software application), the removal of a software product, the application of a set of patches or of a whole service pack to a software product. The management rules are applied on each client 115 directly under its control; in this way, the workload may be distributed among the clients 115, with a beneficial effect on the performance of the server 110.

With reference in particular to the server 110, a configuration manager 405 controls the management of the clients 115. For this purpose, the configuration manager 405 controls a global configuration information repository 410 that stores global configuration information of the clients 115; for example, for each client 115 the global configuration information indicates the management rules to be enforced and its compliance thereto, the role of the client 115 (endpoint/relay), the current values of its operative parameters against the reference polices. The configuration manager 405 exposes a console (not shown in the figure), which may be used by a system administrator to control the management of the computing system (for example, by maintaining the management rules, enforcing the application thereof on the clients and tracking its progress in near real time).

Moving to each client 115, a management agent 415 controls the application of the relevant management rules thereon. The configuration manager 405 and the management agent 415 communicate between them via management messages (known as fixlets in the IEM). Particularly, the management messages are used by the server 110 to deploy the management rules to be applied on the client 115; this generally comprises the downloading on the client 115 of corresponding management data that is required to apply the management rules (for example, software packages comprising the software products to be installed or upgraded). The management messages may also be used by the management agent 415 to report status information of the client 115 to the configuration manager 405 (in response to requests therefrom in corresponding management messages). The management agent 415 controls a local configuration information repository 420 that stores local configuration information of the client 115; for example, the local configuration information indicates the management rules that have been applied (or are to be applied) on the client 115, the role of the client 115 (endpoint/relay), the server 110 or the relay on which it depends, and the child clients depending on the client 115 when it is a relay. In the latter case, the management agent 415 further interacts with a relay agent 425 installed on the relay 115. The relay agent 425 implements a proxy that operates as an intermediate between the server 110 and the child clients depending on the relay 115 (not shown in the figure). Particularly, the relay agent 425 provides a cache mechanism for storing the management data downloaded from the server 110 temporary for its supply to the child clients directly. For this purpose, the relay agent 425 controls a management data repository 430 that caches the management data that has been downloaded from the server 110 (for the relay 115 itself and/or for its child clients); in this way, whenever a child client requires management data already available in the management data repository 430, the management data is returned directly from the relay 115 without downloading it again from the server 110 (otherwise, the request is forwarded to the server 110 on behalf of the child client).

Referring back to the server 110, in the solution according to an embodiment of the present disclosure, a reference manager 435 controls a reference policy repository 440 that stores the reference policies for the operative parameters of the clients 115. For example, the reference policies may be obtained from product guidelines, best practices, user requirements; a very simple example of these reference policies is a table that indicates the maximum number of child clients that may depend on each relay according to the size of its working memory (such as 10 for 1 GBytes, 100 for 2 GBytes, 500 for 4 GBytes and 1,000 for 8 GBytes).

A parameter monitor 445 accesses the reference policy repository 440 to determine the operative parameters of the clients 115 to be monitored for verifying their compliance to the reference policies (for example, the size of the working memory of each client and the number of child clients depending on each relay). The parameter monitor 445 interacts with the configuration manager 405 to monitor these operative parameters against the reference policies. For this purpose, the configuration manager 405 sends corresponding managing messages to the management agent 415 of each client 115, so as to cause it to activate a parameter probe 450 thereon for each operative parameter to be monitored (for example, a corresponding service); the configuration manager 405 receives information about the compliance of each client 115 to the reference policies from its management agent 415 via corresponding managing messages, and passes it to the parameter monitor 445 for its saving into a compliance information repository 455.

A remediation engine 460 determines remediation actions to be executed (comprising the roles of the clients 115 to be changed) for restoring the compliance of the operative parameters of each client 115 to the operative policies; for this purpose, the remediation engine 460 accesses the reference policy repository 440, the compliance information repository 455 and the global configuration information repository 410. The remediation engine 460 drives the configuration manager 405 to enforce the execution of the remediation actions on the relevant clients 115, comprising changing their roles when it is necessary (via corresponding managing messages to the corresponding management agents 415).

Figure 5A:
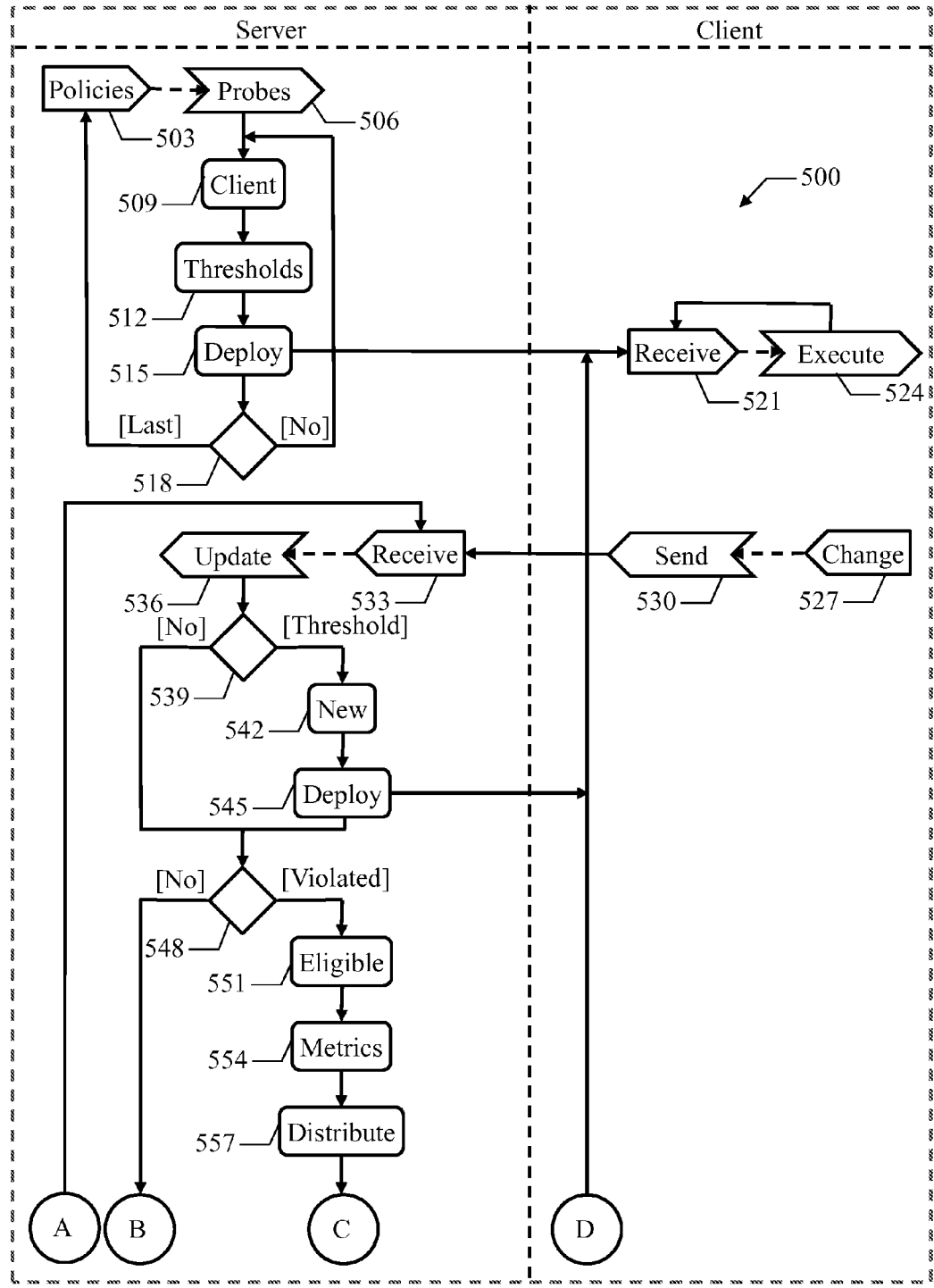
FIG. 5A-FIG. 5B show an activity diagram describing the flow of activities relating to an implementation of the solution according to an embodiment of the present disclosure.
Figure 5B:
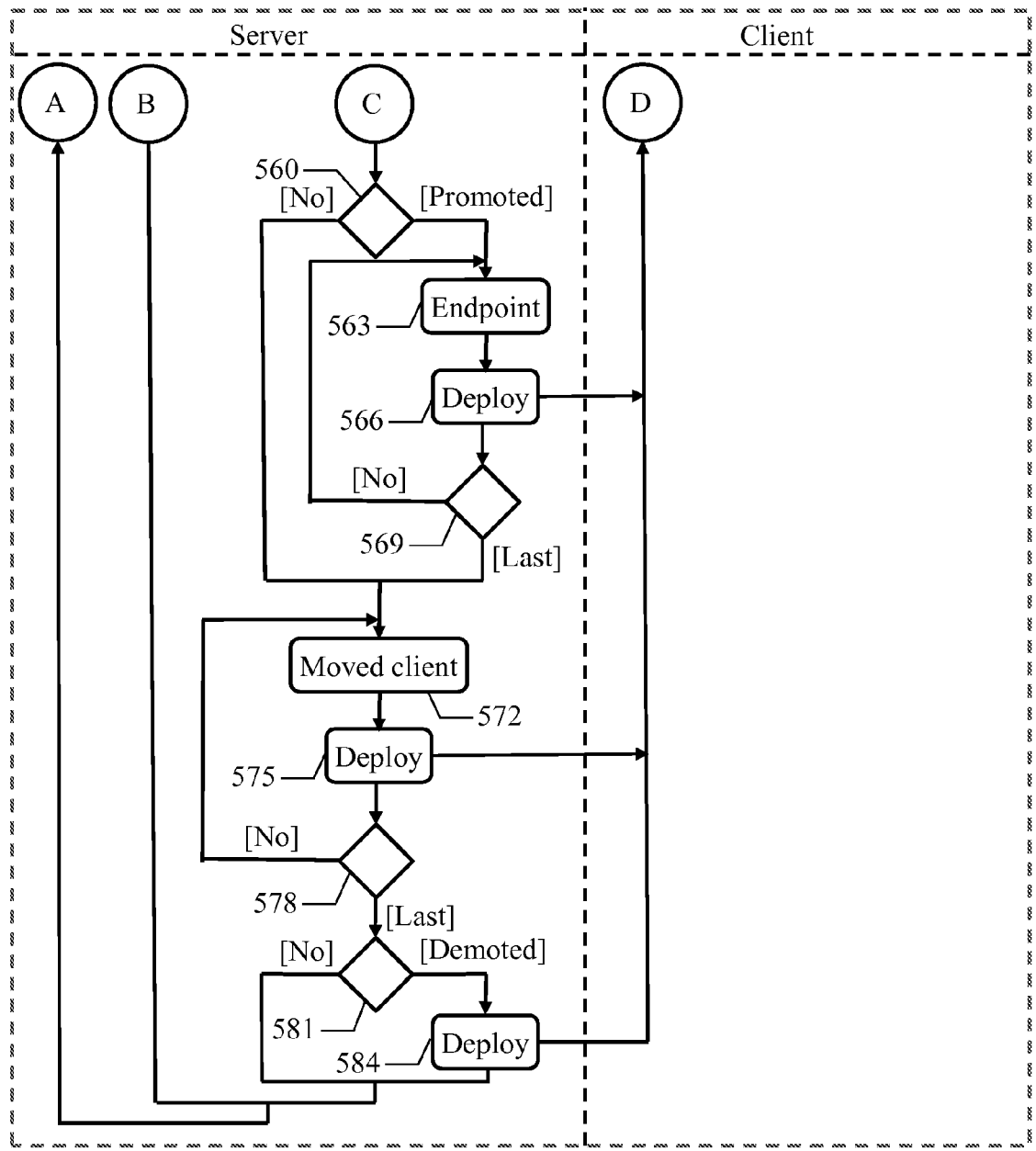

With reference now to FIG. 5A-FIG. 5B, an activity diagram is shown describing the flow of activities relating to an implementation of the solution according to an embodiment of the present disclosure.

Particularly, the diagram represents an exemplary process of managing the above-described computing system with a method 500. In this respect, each block may represent one or more executable instructions for implementing the specified logical function on the relevant computing machine.

Starting from the swim-lane of the server, the process passes from block 503 to block 506 whenever the reference policies change (because a reference policy is added, updated or removed). In response thereto, the operative parameters and the corresponding parameter probes affected by the change of the reference policies are determined; for example, in case of the publication of the above-mentioned reference policy (indicating the maximum number of child clients that may depend on each relay according to the size of its working memory) a new parameter probe is provided for measuring the number of child clients on each relay and a new parameter probe is provided for detecting any change in the size of the working memory on each client.

A loop is then performed for enforcing these changes of the parameter probes onto the clients. The loop begins at block 509 wherein a (current) client is taken into account (starting from a first one in any arbitrary order). Moving to block 512, one or more verification thresholds may be determined for each operative parameter (affected by the change of the reference policies). Particularly, the verification thresholds comprise a reference threshold (or more) that defines a reference condition to be verified to determine the compliance of the corresponding operative parameter to the reference policies. The reference threshold depends on the reference policies and on the current values of the operative parameters of the client (if they are already known, as described in the following). For example, in case of the above-mentioned reference policy (i.e., maximum number of child clients equal to 10, 100, 500 and 1,000 for the size of the working memory equal to 1 GBytes, 2 GBytes, 4 GBytes and 8 GBytes, respectively), when the size of the working memory of each relay is known, the reference threshold for the parameter probe measuring the number of child clients is equal to 10, 100, 500 and 1,000 when the size of the working memory is equal to 1 GBytes, 2 GBytes, 4 GBytes and 8 GBytes, respectively. The verification thresholds may also comprise an eligibility threshold (or more) that defines an eligibility condition determining when the client is eligible or not to contribute to remedying the non-compliance of any other client. For example, in case of the same reference policy, when the size of the working memory of each relay is known, the eligibility threshold (for making the relay eligible to receive additional child clients) is defined by the number of the child clients equal to a half of its maximum value, i.e., 5, 50, 250 and 500 when the size of the working memory is equal to 1 GBytes, 2 GBytes, 4 GBytes and 8 GBytes, respectively. The parameter probes so determined (with their possible verification thresholds) are deployed onto the client at block 515 by creating and sending it a corresponding management message. A test is then made at block 518 to determine whether a last client has been taken into account. If not, the process returns to the block 509 to repeat the same operations on a next client. Conversely, once all the clients have been taken into account, the process returns to the block 503 waiting for a next change of the reference policies.

Moving to the swim-lane of a generic client, the process passes from block 521 to block 524 as soon as a management message is received from the server (possibly via one or more corresponding relays). In response thereto, the action indicated in the management message is executed on the client. The process then returns to the block 521 waiting for a next management message. Particularly, when the management message is received from the block 515, the corresponding change of the parameter probes is applied on the client. For example, in case of the above-mentioned reference policy, this may involve the downloading and the activation on each relay of the parameter probe for measuring the number of child clients (for detecting when the number of child clients reaches, i.e., becomes possibly strictly higher than, the reference threshold or when it crosses, i.e., becomes possibly strictly lower/higher than, the eligibility threshold) and this may involve the downloading and the activation on each client of the parameter probe for detecting any change in the size of the working memory.

In a completely independent way, the process passes from block 527 to block 530 as soon as one of the parameter probes of the client detects an event to be notified to the configuration manager (i.e., the reaching of the reference threshold or the crossing of the eligibility threshold by the number of child clients on each relay or the change of the size of the working memory on each client, comprising after a first measuring thereof). In response thereto, a management message indicative of this event (i.e., comprising an identifier of the client and of the type of event) is created and sent to the server (possibly via one or more corresponding relays).

Referring back to the swim-lane of the server, the process passes from block 533 to block 536 as soon as a management message is received from any client. In response thereto, the global configuration information relating to this client is updated accordingly; particularly, in the example at issue this may involve flagging a relay as eligible (to contribute to remedying the non-compliance of any other client) when the number of child clients has become possibly strictly lower than the eligibility threshold or as non-eligible when the number of child clients has become possibly strictly higher than the eligibility threshold, or it may involve saving the size of the working memory of any client. A test is then made at block 539 to verify whether the received management message involves a change of the reference thresholds of the client; in the example at issue, this happens when the management message indicates a change of the size of the working memory of a relay (comprising when it is measured for the first time). If so, the new values of the reference thresholds are determined at block 542; for example, when the size of the working memory is increased by passing from 1 GBytes to 2 GBytes, the reference threshold (maximum number of child clients for being compliant to the reference policies) passes from 10 to 100 and the eligibility threshold (minimum number of child clients for participating in the remediation of any other client) passes from 5 to 50. The change of the reference thresholds so determined is deployed onto the client at block 545 by creating and sending it a corresponding management message. This management message is received by the client at block 521 and its action is executed thereon at block 524 as above; particularly, in this case the corresponding change of the reference thresholds is applied to the parameter probe for measuring the number of child clients. The flow of activity then descends (in the swim-lane of the server) from the block 545 into block 548; the same point is also reached from the block 539 directly when the management message does not involve any change of the reference thresholds of the client (i.e., when it indicates the reaching of a verification threshold or the crossing of an eligibility threshold in the example at issue).

At this point, a test is made to verify whether the management message indicates that a reference threshold (or more) has been reached, meaning that the corresponding reference condition has been violated (since it is not fulfilled any longer) and then the client has become non-compliant to the reference policies; in the example at issue, this happens when the child clients of any relay reach the maximum number that may be served by the relay according to the size of its working memory (such as 100 for 2 GBytes). If not, the process returns to the block 533 waiting for a next management message. Conversely, the flow of activity descends into block 551, wherein the other clients that are eligible to participate in remedying the non-compliant client are identified (according to the global configuration information); in the example at issue, the eligible clients comprise any relay flagged as such (since the number of its child clients is possibly strictly lower than the corresponding eligibility threshold) and any suitable endpoint (for example, having the size of the working memory that is possibly strictly higher than a corresponding threshold indicated in another reference policy, such as 1 GBytes). With reference now to block 554, a metric (or more) is calculated for the pair formed by the non-compliant relay and each eligible client (according to the global configuration information). The metric measures a distance between the non-compliant relay and the eligible client of the pair; for example, the distance may be expressed by a quality index of a corresponding connection in the communication network. Continuing to block 557, the child clients of the non-compliant relay are distributed among it and the eligible clients so as to restore the compliance of the non-compliant relay to the reference polices. This operation is also performed according to an optimization criterion (or more) based on the above-mentioned metrics. For example, the optimization criterion distributes the child clients so as to minimize a cost function equal to the sum of the distances of the child clients from their relays; this result may be achieved by moving the child clients to the closest eligible clients until the number of child clients of the non-compliant relay falls under its reference threshold. For this purpose, the number of child clients of the eligible relays may be approximated by excess to their eligibility threshold or it may be actually measured at the moment via corresponding management messages (not shown in the figure). In any case, the above-mentioned operation may be performed either in a completely automatic way or by warning the system administrator to require his/her approval.

A test is then made at block 560 to verify whether the distribution of the child clients (of the non-compliant relay) involves the promotion of one or more eligible clients from endpoint to relay (denoted as promoted endpoints). If so, the promotion of these promoted endpoints is enforced thereon. For this purpose, a loop is entered at block 563 wherein a (current) promoted endpoint is taken into account (starting from a first one in any arbitrary order). Moving to block 566, the global configuration information is updated accordingly; moreover, a corresponding management message is created and sent to the promoted endpoint. This management message is received by the promoted endpoint at block 521 and its action is executed thereon at block 524 as above; particularly, in this case the corresponding relay agent is activated for the child clients that have been distributed thereto. A test is then made at block 569 (in the swim-lane of the server) to determine whether a last promoted endpoint has been taken into account. If not, the process returns to the block 563 to repeat the same operations on a next promoted endpoint. Conversely, once all the promoted endpoints have been taken into account, the process descends into block 572; the same point is also reached from the block 560 directly when the distribution of the child clients does not involve the promotion of any eligible clients from endpoint to relay.

At this point, a loop is performed for enforcing the movement of the child clients that have been moved from the non-compliant relay to the eligible clients (referred to as moved clients); the loop begins by taking into account a (current) moved client (starting from a first one in any arbitrary order). Moving to block 575, the global configuration information is updated accordingly; moreover, a corresponding management message is created and sent to the moved client. This management message is received by the moved client at block 521 and its action is executed thereon at block 524 as above; particularly, in this case the local configuration information is updated accordingly (to have the moved client pointing to its new relay). A test is then made at block 578 (in the swim-lane of the server) to determine whether a last moved client has been taken into account. If not, the process returns to the block 572 to repeat the same operations on a next moved client. Conversely, once all the moved clients have been taken into account, the process descends into block 581.

At this point, a test is made to verify whether the distribution of the child clients involves the demotion of the non-compliant relay to endpoint. If not, the process returns to the block 533 waiting for a next management message. Conversely, the flow of activity descends into block 584, wherein the demotion of the non-compliant relay is enforced. For this purpose, the global configuration information is updated accordingly; moreover, a corresponding management message is created and sent to the non-compliant relay. This management message is received by the non-compliant relay at block 521 and its action is executed at block 524 as above; particularly, in this case the corresponding relay agent is deactivated. The process then returns to the block 533 (in the swim-lane of the server) waiting for a next management message.

In this way, the detection of the non-compliance of the operative parameters to the reference policies is distributed among the clients, with a beneficial effect on the performance of the server. Moreover, this reduces the traffic on the communication network, since the clients only report their change of status (non-compliant, eligible, non-eligible) to the server, instead of any change of their operative parameters.

Modifications

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may even be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with any embodiment of the present disclosure may be incorporated in any other embodiment as a matter of general design choice. In any case, ordinal or other qualifiers are merely used as labels to distinguish elements with the same name but do not by themselves connote any priority, precedence or order. Moreover, the terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing a computing system. The computing system comprises a plurality of client computing machines to be managed and at least one server computing machine for controlling the managing of the client computing machines; each client computing machine has at least one of a plurality of roles in a deployment infrastructure for deploying management data from said at least one server computing machine to the client computing machines. The method comprises the following steps. One or more operative parameters of each client computing machine are monitored against one or more reference policies. A non-compliance of the operative parameters to the reference policies is detected. The role of at least one of the client computing machines is changed in response to the non-compliance of the operative parameters to the reference policies for restoring a compliance thereto.

However, the computing system may be of any type (for example, a LAN); the management of the computing system may be of any type (for example, for asset inventory/discovery, security vulnerability detection/remediation, software license control). The computing machines may be in any number and of any type (either of physical or virtual type); particularly, the server computing machine may be replicated for disaster recovery, the client computing machines may be other servers, tablets, Point Of Sale (POS) devices, Automated Teller Machines (ATMs), self-service kiosks. The server computing machine may control the management of the client computing machines in any way (for example, with a declarative and/or centralized approach). Each client computing machine may have any number and type of roles (see below). The deployment infrastructure may be of any type (for example, a mesh) for deploying any type of management data (for example, scanners, license entitlements). The operative parameters may be in any number and of any type (for example, processing power, processing usage, working memory usage, mass memory capacity, mass memory usage). The reference policies may be in any number and of any type (for example, defining the maximum number of software applications that may be installed according to the mass memory capacity). The non-compliance of the operative parameters to the reference policies may be detected in any way and the roles of any number and type of client computing machines may be changed in any way to restore the compliance of the operative parameters to the reference policies (see below).

In an embodiment, each client computing machine may have a relay role (for deploying the corresponding management data on one or more other client computing machines being child client computing machines depending thereon) or an endpoint role otherwise.

However, each client computing machine having the relay role may serve any number of child client computing machines (with any number of tiers of the deployment infrastructure). In any case, the client computing machines may have different, additional or alternative roles (for example, depot for the management data, hub for the management messages).

In an embodiment, said step of detecting a non-compliance of the operative parameters to the reference policies comprises detecting a non-compliant client computing machine of the client computing machines having the relay role in response to the non-compliance of the corresponding operative parameters to the reference policies.

However, the non-compliant client computing machine may be detected in any way (see below). In any case, the non-compliance of the operative parameters to the reference policies may be determined differently (for example, by correlating the operative parameters of the client computing machines among them, such as to determine a total number of client computing machines depending directly or indirectly on each client computing machine having the relay role).

In an embodiment, said step of changing the role of at least one of the client computing machines comprises demoting the non-compliant client computing machine to the endpoint role.

However, the non-compliant computing machine may also maintain the relay role (for example, by simply reducing the child client computing machines depending thereon).

In an embodiment, said step of changing the role of at least one of the client computing machines comprises promoting at least one the clients computing machines having the endpoint role to the relay role.

However, any number of client computing machines may be promoted from the endpoint role to the relay role (down to none).

In an embodiment, said step of changing the role of at least one of the client computing machines comprises distributing at least part of the child client computing machines depending on the non-compliant client computing machine to depend on at least one of the other client computing machines having the relay role.

However, any number of child client computing machines of the non-compliant client computing machine may be distributed among any number of other client computing machines having the relay role (up to all).

In any case, it is possible to perform only parts of the above-mentioned operations of demoting, promoting and distributing, or any combination thereof. Moreover, different, additional or alternative operations may be performed; for example, it is also possible to change the hardware and/or software configuration of the client computing machines, to create new client computing machines with the relay role.

In an embodiment, said step of changing the role of at least one of the client computing machines comprises selecting said at least one client computing machine whose role is to be changed according to at least one optimization criterion of the computing system.

However, the optimization criteria may be in any number and of any type (see below); in any case, any other selection of the client computing machines whose role is to be changed (for example, random) is not excluded in a basic implementation.

In an embodiment, said step of distributing at least part of the child client computing machines depending on the non-compliant client computing machine comprises distributing said at least part of the child client computing machines depending on the non-compliant client computing machine according to said at least one optimization criterion.

However, the distribution of the child computing machines may be based on different, additional or alternative optimization criteria (see below), down to none.

In an embodiment, said at least one optimization criterion is based on a metric measuring a distance between each pair of client computing machines.

However, the metric may measure any type of distance (for example, depending on the common software applications running on the client computing machine of the pair). In any case, the optimization criteria may be of any other type (for example, based on load-balancing techniques).

In an embodiment, the method further comprises adapting one or more reference conditions for each client computing machine according to the reference policies and to the operative parameters of the computing machine. Said step of monitoring one or more operative parameters comprises monitoring the operative parameters of each client computing machine against the corresponding reference conditions.

However, the reference conditions for each client computing machine may be in any number and of any type (for example, a maximum threshold for the average usage of the working memory), and they may depend on its operative parameters in any way (for example, setting the maximum number of child client computing machines according to the processing power). In any case, the possibility of verifying the operative parameters directly against the reference policies (without defining any reference conditions changing dynamically) is not excluded.

In an embodiment, said step of monitoring one or more operative parameters comprises receiving a notification of the non-compliance of the operative parameters of each client computing machine to the reference policies from the computing machine.

However, in a different implementation the client computing machines may simply measure the operative parameters and report them (or any change thereof) to the server computing machine, which performs their verification against the reference policies centrally.

Generally, similar considerations apply if the same solution is implemented with an equivalent method (by using similar steps with the same functions of more steps or portions thereof, removing some steps being non-essential, or adding further optional steps); moreover, the steps may be performed in a different order, concurrently or in an interleaved way (at least in part).

A further embodiment provides a computer program, which is configured for causing a computing system to perform the steps of the above-described method. A further embodiment provides a computer program product comprising a non-transitory computer readable medium embodying a computer program, which computer program is loadable into a working memory of a computing system thereby configuring the computing system to perform the same method.

However, the computer program may be implemented as a stand-alone module, as a plug-in for a pre-existing software product (for example, a resource management application), or even directly in the latter. As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system". Furthermore, aspects of the present invention may take the form of a computer program product embodied in one or more computer readable medium(s) having computer readable program code embodied thereon. Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in base-band or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the relevant computer, as a stand-alone software package, partly on this computer and partly on a remote computer or entirely on the remote computer. In the latter scenario, the remote computer may be connected to the computer through any type of network, including a local area network (LAN) or a wide area network (WAN), or the connection may be made to an external computer (for example, through the Internet using an Internet Service Provider). Aspects of the present invention have been described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A further embodiment provides a system comprising means configured for performing the steps of the same method.

However, the method may be performed on any system. The system may be based on a different architecture (for example, a local, wide area, global, cellular or satellite network), and it may exploit any type of (wired and/or wireless) connections. However, the implementation of the method on a stand-alone computer (for managing virtual machines hosted thereon) is not excluded. In any case, each computing machine used to implement the method may have another structure or may comprise similar elements; moreover, it is possible to replace the computing machine with any code execution entity, based on either a physical machine or a virtual machine or any combination thereof.

Generally, similar considerations apply if the system has a different structure or comprises equivalent components, or it has other operative characteristics. In any case, every component thereof may be separated into more elements, or two or more components may be combined together into a single element; moreover, each component may be replicated to support the execution of the corresponding operations in parallel. Moreover, unless specified otherwise, any interaction between different components generally does not need to be continuous, and it may be either direct or indirect through one or more intermediaries.

The invention claimed is:

1. A method for managing a computing system comprising a plurality of client computing machines to be managed and at least one server computing machine, each client computing machine having at least one of a plurality of roles in a deployment infrastructure for deploying management data from said at least one server computing machine to the client computing machines, wherein the method comprises:
    monitoring one or more operative parameters of each client computing machine against one or more reference policies;
    detecting a non-compliance of the operative parameters to the reference policies;
    restoring a compliance of the operative parameters to the reference policies by changing a role of at least one of the client computing machines in response to the non-compliance of the operative parameters to the reference policies;
    including in a parameter probe for each client computing machine one or more reference threshold conditions for each client computing machine according to the reference policies and to the operative parameters of each client computing machine; and
    deploying the parameter probe for each client computing machine to each respective one of the client computing machines;
    wherein said monitoring one or more operative parameters comprises:
    monitoring the operative parameters of each client computing machine against the corresponding reference threshold conditions using the deployed parameter probe for each client computing machine that is resident on the each client computing machine.

2. The method according to claim 1, wherein monitoring the one or more operative parameters of each client device against one or more reference policies comprises monitoring a number of child clients depending on each client computer machine configured to be the relay role.

3. The method according to claim 2, wherein said detecting a non-compliance of the operative parameters to the reference policies is performed by at least one of the client computing machines and comprises:
    detecting a non-compliant client computing machine of the client computing machines having the relay role in response to the non-compliance of the corresponding operative parameters to the reference policies.

4. The method according to claim 3, wherein said changing the role of at least one of the client computing machines comprises:
    demoting the non-compliant client computing machine to the endpoint role.

5. The method according to claim 4, wherein said changing the role of at least one of the client computing machines further comprises:
    promoting at least one of the client computing machines having the endpoint role to the relay role.

6. The method according to claim 3, wherein said changing the role of at least one of the client computing machines comprises:
    distributing, as directed by the at least one server computing machine, at least part of the child client computing machines depending on the non-compliant client computing machine to depend on at least one of the other client computing machines having the relay role.

7. The method according to claim 6, wherein said changing the role of at least one of the client computing machines comprises:
    selecting, by the at least one server computing machine, said at least one client computing machine whose role is to be changed according to at least one optimization criterion of the computing system.

8. The method according to claim 7, wherein said distributing, as directed by the at least one server computing machine, at least part of the child client computing machines depending on the non-compliant client computing machine comprises:

distributing said at least part of the child client computing machines depending on the non-compliant client computing machine according to said at least one optimization criterion.

9. The method according to claim 8, wherein said at least one optimization criterion is based on a metric measuring a distance between each pair of client computing machines.

10. The method according to claim 1, wherein said monitoring one or more operative parameters comprises:

receiving a notification of the non-compliance of the operative parameters of each client computing machine to the reference policies from each client computing machine.

11. The method according to claim 3, wherein said changing the role of at least one of the client computing machines comprises:

demoting the non-compliant client computing machine having at least one child client computing machine attached thereto to the endpoint role and detaching the at least one child client computing machine from the non-compliant client computing machine having the endpoint role; and promoting a given client computing machine of the client computing machines having the endpoint role to the relay role and attaching the at least one child client computer machine to the given client computing machine having the relay role.

12. The method according to claim 1, wherein the detection of the non-compliance of the operative parameters to the reference policies is distributed among the plurality of client computing machines.

13. The method according to claim 1, wherein a given one of the reference threshold conditions is changed for a given one of the client computing machines by deploying a change for the given one of the reference threshold conditions to the given one of the client computing machines responsive to receiving a message from the given one of the client computing machines indicating a configuration change pertaining to the given one of the client computing machines.

14. The method according to claim 1, wherein the parameter probe is deployed to its respective client computing machine responsive to the respective client computing machine meeting an eligibility threshold that defines an eligibility condition that determines when the respective client computing machine is eligible to contribute to remedying a non-compliance of any other client.

15. The method according to claim 1, wherein the one or more reference policies define conditions to be fulfilled by the plurality of client computing machines to be compliant thereto and actions to be executed on the plurality of client computing machines to make them compliant to the one or more reference policies.

16. The method according to claim 15, wherein the one or more operative parameters is two or more operative parameters that comprises a size of a working memory of each of the plurality of client computing machines and a number of child client computing machines depending on each client computing machine having a relay role.

17. The method according to claim 16, wherein the one or more reference policies define a maximum number of child client computing machines that may depend upon a given client computing machine having a relay role according to a size of its working memory.

18. The method according to claim 1, wherein deploying the parameter probe to each of the client computing machines is performed responsive to a change in at least one of the reference policies.

19. The method according to claim 18, further comprising:

determining a particular parameter probe to be deployed to a respective client computing machine based on an operating parameter of the operating parameters that is affected by the change in the at least one of the reference policies.

20. A computer program product comprising a non-transitory computer-readable medium embodying program code that is configured to cause a computing system to perform the method according to claim 1 when the program code is executed on the computing system.

21. A system for managing a computing system comprising a plurality of client computing machines to be managed and at least one server computing machine for controlling the managing of the client computing machines, each client computing machine having at least one of a plurality of roles in a deployment infrastructure for deploying management data from said at least one server computing machine to the client computing machines, comprising:

a storage device;

a data processor coupled to the storage device; and program code, stored in the storage device, that is configured to perform, when executed by the data processor, steps of:

monitoring one or more operative parameters of each client computing machine against one or more reference policies;

detecting a non-compliance of the operative parameters to the reference policies;

restoring a compliance of the operative parameters to the reference policies by changing a role of at least one of the client computing machines in response to the non-compliance of the operative parameters to the reference policies;

including in a parameter probe for each client computing machine one or more reference threshold conditions for each client computing machine according to the reference policies and to the operative parameters of each client computing machine; and deploying the parameter probe for each client computing machine to each respective one of the client computing machines;

wherein said monitoring one or more operative parameters comprises:

monitoring the operative parameters of each client computing machine against the corresponding reference threshold conditions using the deployed parameter probe for each client computing machine that is resident on the each client computing machine.

* * * * *